2,844,440
Patented July 22, 1958

2,844,440

REGENERATION OF CAUSTIC SOLUTIONS CONTAINING MERCAPTANS

Percy Hainsworth, Sunbury-on-Thames, England, assignor to The British Petroleum Company Limited No Drawing. Application September 20, 1954
Serial No. 457,279

Claims priority, application Great Britain September 24, 1953

8 Claims. (Cl. 23—184)

This invention relates to the regeneration of caustic solutions containing mercaptans, such as those used in the treatment of petroleum hydrocarbons for the removal of sulphur compounds therefrom.

From time to time it is necessary to regenerate the mercaptan-containing caustic solution either by boiling out most of the mercaptans and burning them as was originally done or by converting the mercaptans into disulphides which are insoluble in caustic solution and can be removed by settling and decanting and/or oil washing. This conversion of mercaptans into disulphides is effected by using an oxygen-containing gas, such as air, in the presence of an oxidation catalyst. Suitable catalysts comprise tannin and similar organic bodies which however, suffer from the disadvantage that they are themselves converted by oxidation into a form in which they are no longer effective as oxidation catalysts. In the regeneration of mercaptan-containing caustic solutions therefore using such oxidation catalysts, it is necessary to leave a small proportion of the mercaptans unoxidised since it has been found that by this means the oxidation of the organic oxidation catalyst, is prevented. This means, however, that the regeneration of the caustic solution cannot be taken to completion so that the efficiency of the mercaptan extraction process is correspondingly reduced.

This disadvantage would be avoided if the regeneration of the mercaptan-containing caustic solution could be effected by means of an oxygen containing gas alone, but with normal contacting methods, the rate of oxidation, that is, the percent wt. of mercaptan sulphur removed per hour from the caustic solution, is too slow for this method to be a practicable one. The principal object of the present invention is to enable the regeneration of mercaptan-containing caustic solutions to be effected in the absence of an oxidation catalyst by means of an oxygen-containing gas in a sufficiently short period of time to constitute an economical and practicable process. Another important object of the invention is to effect the regeneration of the mercaptan-containing caustic solution at a temperature low enough to prevent discolourisation of the oil after treatment with the regenerated solution.

According to the present invention, the regeneration of mercaptan-containing caustic solutions is effected in the absence of organic oxidation catalysts by means of oxygen or an oxygen-containing gas, such as air, which is introduced into the caustic solution in the form of extremely small bubbles.

The invention will hereinafter be described with reference to the use of air as the oxidising gas.

The necessary dispersion of the air in the caustic solution may be effected in various ways. Thus, the air may be fed together with the caustic solution to the suction side of a centrifugal pump. Again, the air may be fed into the centre of a high speed stirrer rotating in the caustic solution. Yet again, the air may be fed into the caustic solution via a sintered metal distributor. Thus, in experiments carried out it was found that a stainless steel sinter having a diameter of 1.25" and a thickness of ⅛" was sufficient to regenerate 400/800 ml. of solution per hour in a column of about 18" in height. Under these conditions the sintered metal distributor had a back pressure of about 2 p. s. i. and required only occasional cleaning, for example by immersion in dilute phosphoric acid.

The improvement brought about by the dispersion of the air in the caustic solution in the form of extremely small bubbles is illustrated by the data set out in the following table.

| Method of air dispersion | Pore diameter, microns | Tannin, percent wt. | Temperature, °F. | Oxygen Utilisation, percent vol. | Mercaptan Sulphur Removal, percent wt./hr. |
|---|---|---|---|---|---|
| (1) H₃ glass sinter | 15-40 | .4 | 145 | 27 | .22 |
| (2) H₁ glass sinter | 90-150 | .45 | 140 | 11 | .11 |
| (3) Gooch crucible | 1,000 | .40 | 140 | 3 | .02 |
| (4) High speed mixer | | nil | 62-158 | 30 | .9 |
| (5) Centrifugal pump | | nil | 135 | 41 | .11 |
| (6) Mild steel sinter | 10 | nil | 130 | 30 | .05 |
| (7) ½" steel pipe | 3,200 | nil | 130 | | .01 |

It will be seen that satisfactory oxidation rates and oxygen utilisations were obtained in the absence of tannin in the case of methods of air dispersion Nos. 4-6 in all of which the air is present in the form of extremely small bubbles. With further reference to the foregoing table and particularly with reference to the cases of air dispersion Nos. 1-3 wherein tannin is present as an oxidizing agent, the oxidation rate, i. e., the speed at which mercaptan sulphur is removed, is satisfactory for commercial purposes at .22% wt./hr. and .11% wt./hr. in the cases Nos. 1 and 2, and is too low for commercial purposes at .02% wt./hr., in the case No. 3. In the cases of air dispersion Nos. 4 and 5 wherein tannin as oxidizing agent is absent, the oxidation rates of .9%. wt./hr. and .11% wt./hr., respectively, are clearly commercially satisfactory, and the oxidation rate of 0.05% wt./hr., in the case No. 6, though low, is still two and a half times higher than the rate in the case No. 3, and is just adequate for commercial purposes. It will be observed that in the case No. 6 the pore diameter of the metal sinter, as a measure of the bubble size, is 10 microns, whereas in the cases 4 and 5, which result in higher oxidation rates, the bubble size is certainly very much less than that obtained using a sinter having a pore size of 10 microns, being so small as to be impossible of measurement.

The following data illustrate more fully effectiveness of a sintered metal distributor.

A number of extractions were carried out on heavy benzines and stabilised gasolines with continuously regenerated solutizer solutions containing no tannin. Regenerations were effected first at 120°/140° F. and later at room temperature i. e. 60/80° F., in order to avoid the colour formation experienced at 140° F. As there was no tannin present, the solution was regenerated to the lowest percentage of mercaptan sulphur attainable under the conditions employed, i. e. at 80° F. or 140° F., 90 minutes residence time and air rate about 100 ml./minute or 2400 cu. ft./1000 gallons of solutizer solution. The results set out in the following Table No. 1 show that the regenerated solutizer solution was almost as effective as fresh solution.

Table 1

| Heavy Benzine | Temperature of Regeneration, °F. | Mercaptan Sulphur Content, percent by wt. | | | | |
|---|---|---|---|---|---|---|
| | | In Solutizer | | In Oil | | In Oil After Extraction with Fresh Solutizer |
| | | Before Regen. | After Regen. | Before Extract | After Extract | |
| Kuwait | 120 | .013 | .002 | | | |
| | | .04 | .002 | .020 | .006 | .005 |
| | | .05 | .003 | | | |
| Qatar | 140 | .060 | .006 | .024 | .010 | .011 |
| | | .053 | .003 | | | |
| | 80 | | | .022 | .011 | .011 |
| Agha Jari | 80 | .127 | | .043 | .007 | .006 |

Iraq and Qatar stabilised gasolines, after extraction with solutizer solution regenerated at 140° F., became highly coloured. The colour was reduced by frequent changes of wash oil or by water washing the extracted heavy benzine. No such colour formation occurred when solutizer was regenerated at 80° F. The results are set out in the following Table No. 2.

Table 2

| Benzine | Colour: Lovibond 6" cell | | | |
|---|---|---|---|---|
| | Before Treatment | After Treatment with Solutizer | | |
| | | Fresh | Regenerated at 140° F. | Regenerated at 80° F. |
| Qatar Heavy Benzine | 0.1Y | .4Y | 1.0Y+0.2R | 0.1Y+0.1R |
| Kuwait Heavy Benzine | 0.3Y+0.2R | 0.8Y+0.5R | 0.9Y+0.2R | |
| Qatar Stab. Gas | 0.2Y | 0.6Y+0.1R | 0.6Y+0.2R | |
| Iraq Stab. Gas | 0.2Y | 0.2Y+0.1R | 0.4Y+0.2R | 0.2Y |

Referring to the above table, the colour of the oils, after treatment with solutizer solution regenerated at 140° F., would have been bad if the wash oil had not been changed frequently and if the treated oils had not been vigorously water washed by hand. No such precautions were taken with the oils treated with solutizer solution regenerated at 80° F.

The advantages to be gained by the use in the solutizer process of an air distributor so effective that regeneration of the spent solutizer solution is adequate without recourse to tannin and heating are:

(1) The regeneration of the solutizer solution can be carried as near as practicable to completion to produce a solution about as effective as fresh solutizer solution.

(2) The possible applications of the solutizer process are extended since in addition to using regenerated solutizer solution for butanes and light gasolines, they can be used effectively to remove less soluble mercaptans.

(3) A lower extraction temperature may be used without taking special steps to that end. In the tannin solutizer process, the regenerated solution is not usually cooled to the ambient temperature although better extraction occurs at lower temperatures.

(4) A lower regeneration temperature is possible thus saving steam and in some cases eliminating the necessity for the use of cupro nickel.

(5) The solutizer process is simpler to control since no determination of tannin content and few determinations of mercaptan sulphur content of regenerated solutizer solutions are required.

I claim:

1. In the method of regenerating a mercaptan-containing caustic alkali solution by contacting the solution in the absence of an organic oxidation catalyst with an oxidizing gas selected from the class consisting of air and oxygen, the improvement which comprises, introducing the gas into the solution in the form of bubbles at least as small as the bubbles produced by passing said gas through a metal sinter having a pore diameter of 10 microns at a gas rate and in an amount sufficient to effect an oxidation rate of at least about 0.05% wt. per hour of mercaptan sulphur removed.

2. In the method of regenerating a mercaptan-containing caustic alkali solution by contacting the solution in the absence of an organic oxidation catalyst with an oxidizing gas selected from the class consisting of air and oxygen, the improvement which comprises, introducing the gas into the solution in the form of bubbles at least as small as the bubbles produced by passing said gas through a metal sinter having a pore diameter of 10 microns, said gas being introduced into the solution by passage through a metal sinter disposed in said solution at a gas rate and in an amount sufficient to effect an oxidation rate of at least about 0.05% wt. per hour of mercaptan sulphur removed.

3. In the method of regenerating a mercaptan-containing caustic alkali solution by contacting the solution in the absence of an organic oxidation catalyst with an oxidizing gas selected from the class consisting of air and oxygen, the improvement which comprises, introducing the gas into the solution in the form of bubbles at least as small as the bubbles produced by passing said gas through a metal sinter having a pore diameter of 10 microns, by feeding said gas together with said solution to the suction side of a centrifugal pump at a gas rate and in an amount sufficient to effect an oxidation rate of at least about 0.05% wt. per hour of mercaptan sulphur removed.

4. In the method of regenerating a mercaptan-containing caustic alkali solution by contacting the solution in the absence of an organic oxidation catalyst with an oxidizing gas selected from the class consisting of air and oxygen, the improvement which comprises, introducing the gas into the solution in the form of bubbles at least as small as the bubbles produced by passing said gas through a metal sinter having a pore diameter of 10 microns, by feeding said gas into the center of a high speed stirrer rotating in said solution at a gas rate and in an amount sufficient to effect an oxidation rate of at least about 0.05% wt. per hour of mercaptan sulphur removed.

5. In the method of regenerating a mercaptan-containing caustic alkali solution by contacting the solution in the absence of an organic oxidation catalyst with an oxidizing gas selected from the class consisting of oxygen and air, the improvement which comprises, introducing the gas into the solution in the form of bubbles at least as small as the bubbles produced by passing said gas through a sintered metal distributor having a pore diameter of 10 microns at a gas rate and in an amount sufficient to effect an oxidation rate of at least about 0.05% wt. per hour of mercaptan sulphur removed, the solution being at atmospheric temperature.

6. In the method of regenerating a mercaptan-containing caustic alkali solution by contacting the solution in the absence of an organic oxidation catalyst with an oxidizing gas selected from the class consisting of oxygen an air, the improvement which comprises, introducing the gas into the solution in the form of bubbles at least as small as the bubbles produced by passing said gas through a sintered metal distributor having a pore diameter of 10 microns at a gas rate and in an amount sufficient to effect an oxidation rate of at least about 0.05% wt. per hour of mercaptan sulphur removed, the solution being at a temperature of 60 to 80° F.

7. In the method of regenerating a mercaptan-containing caustic alkali solution by contacting the solution in the absence of an organic oxidation catalyst with an oxidizing gas selected from the class consisting of oxygen and air, the improvement which comprises, introducing the gas into the solution in the form of bubbles at least as small as the bubbles produced by passing said gas through a sintered metal distributor having a pore diameter of 10 microns, said gas being introduced into the solution by passage through a sintered metal distributor disposed in said solution and having a pore diameter of 10 microns at a gas rate and in an amount sufficient to effect an oxidation rate of at least about 0.05% wt. per hour of mercaptan sulphur removed, and the solution being at atmospheric temperature.

8. In the method of regenerating a mercaptan-containing caustic alkali solution by contacting the solution in the absence of an organic oxidation catalyst with an oxidizing gas selected from the class consisting of oxygen and air, the improvement which comprises, introducing the gas into the solution in the form of bubbles at least as small as the bubbles produced by passing said gas through a sintered metal distributor having a pore diameter of 10 microns, said gas being introduced at a gas rate and in an amount sufficient to effect an oxidation rate of at least about 0.05% wt. per hour of mercaptan sulphur removed through a sintered metal distributor disposed in the solution and having under the conditions a back pressure of 2 p. s. i., and the solution being at a temperature of 60° to 80° F.

References Cited in the file of this patent
UNITED STATES PATENTS

| | | |
|---|---|---|
| 2,001,715 | Fischer | May 21, 1935 |
| 2,080,654 | Craig | May 18, 1937 |
| 2,426,087 | Fetterly | Aug. 19, 1947 |
| 2,583,083 | Bond et al. | Jan. 22, 1952 |